United States Patent Office 3,415,659
Patented Dec. 10, 1968

3,415,659
COOKING AND SALAD OIL HAVING ANTISPATTERING PROPERTIES
Edward R. Purves, Forest Park, Ohio, assignor to The Procter & Gamble Company, Cincinnati, Ohio, a corporation of Ohio
No Drawing. Filed Dec. 29, 1965, Ser. No. 517,448
5 Claims. (Cl. 99—163)

ABSTRACT OF THE DISCLOSURE

Storage-stable, antispattering cooking and salad oil composition containing from about 0.125% to about 0.3% by weight of the total composition of acid treated unsaturated fatty acid (having about 14 to 18 carbon atoms) monoester of polyoxyethylene sorbitan containing an average of about 20 oxyethylene units per molecule; from about 0.05% to about 0.20% by weight of the total composition of unsaturated fatty acid polyester (having about 14 to 18 carbon atoms) of polyglycerol having an average of from about 4 to about 6 glycerol units, the average ratio of free hydroxyl groups to fatty acid ester groups being from greater than 1.0 to about 2.5.

---

This invention relates to an improved cooking and salad oil composition having antispattering properties. More particularly, this invention relates to antispattering cooking and salad oils which contain small amounts of monoesters of polyoxyethylene sorbitan and long-chain unsaturated acids and polyesters of polyglycerol and long-chain unsaturated fatty acids. Preferably, the antispattering compositions of this invention contain a combination of two types of polyesters of polyglycerol in addition to the monoesters of polyoxyethylene sorbitan. One type of polyester of polyglycerol complements the antispattering properties of the monoesters of polyoxyethylene sorbitan; the other type of ester contributes to the storage stability of the oils.

Liquid vegetable oils such as cottonseed oil, soybean oil, corn oil and olive oil are generally used as cooking and salad oils. In preparing green salads a liquid cooking or salad oil is used to provide an oil coating on the basic ingredients of the salad. A solid fat or plastic shortening is not well suited for this purpose. Liquid oils are also preferred over solid fats and plastic shortenings for many cooking tasks; for example, the frying of potatoes, fish, eggs, and meat products such as cube steaks, minute steaks, and the like. In the deep frying of food products such as doughnuts, potatoes, and potato chips, liquid oils are frequently used. Liquid oils are also used in the preparation of salad dressings and mayonnaise where the consistency and stability of the final product is often adversely affected by solid or plastic fats or shortenings.

Many foods which are prepared by frying in liquid oil have a high moisture content. In pan frying these foods (especially during the early stages of frying), the contact between the relatively cool water in the food and the hot liquid oil in the cooking pan vaporizes the water into steam which in turn causes the hot oil to spatter. It is a common experience to have hot oil spatter from a frying pan when minute steaks, particularly frozen steaks, are placed in a frying pan containing hot oil. The spattered oil is messy; in addition, it can cause minor burns unless care is exercised during the frying operation.

A number of different substances have been suggested as antispattering agents to either inhibit or retard spatter during the frying of foods. Some of these substances are particularly useful in products which are oil-in-water emulsions, such as margarine, wherein they tend to reduce the oil spatter caused by the sudden breakdown of the emulsion when the emulsion is heated. The application of heat causes the oil-in-water emulsion to release large droplets of water. The sudden escape of steam from these droplets expels hot fat particles with sufficient explosive force to cause the fat to spatter. This phenomenon can be observed when margarine is heated in a pan before the addition of any food to the pan. The sodium sulfoacetate derivatives of mono- and diglycerides and other substances such as, for example, those described in U.S. Patents 1,917,249 through 1,917,260, inclusive, are typical margarine antispattering agents. Other antispattering agents for margarine and margarine-type emulsion products are described in U.S. Patents 3,006,772 and 3,015,566.

The present invention is concerned with spattering caused by the moisture contained in food products rather than the water contained in emulsions. Spattering caused by contact between cold, moist food and hot frying fat presents a problem the solution to which is unrelated to the solution of the problem of spattering caused by the sudden breakdown of an emulsion and the accompanying release of water. The ordinary emulsifying agents which are useful in margarine and in various cooking and baking shortenings do not possess the antispattering properties desired for cooking and salad oils, particularly, clear oils. Antispattering agents which are useful in all-purpose plastic shortenings, such as the sorbitol esters of long-chain fatty acids described in U.S. Patent 3,138,463, are not well suited for cooking and salad oils where clarity is an important characteristic.

The copending application of Purves, Going and Dobson, U.S. Ser. No. 517,419, filed concurrently herewith, describes and claims an antispattering cooking and salad oil containing small amounts of monoesters of polyoxyethylene sorbitan and long-chain unsaturated fatty acids. The copending application filed concurrently herewith, of Cunningham, Dobson, Going and Purves, U.S. Ser. No. 517,450, describes and claims a storage-stable cooking and salad oil which contains certain polyesters of polyglycerol and long-chain unsaturated fatty acids (polyglycerol esters) in addition to the monoesters of polyoxyethylene sorbitan and long-chain unsaturated fatty acids described in the Purves, Going and Dobson application. In contrast to the cooking and salad oils described and claimed in the two co-pending applications, the oils of the present invention contain, in addition to the monoesters of polyoxyethylene sorbitan and long-chain unsaturated fatty acids, certain polyglycerol esters which are not included in the oils described and claimed by Cuningham, Dobson, Going and Purves. These polyglycerol esters have antispattering properties which complement those of the polyoxyethylene sorbitan monoesters. A preferred cooking and salad oil composition of this invention contains three additives: monoesters of polyoxyethylene sorbitan; polyglycerol esters disclosed in the Cunningham, Dobson, Going and Purves applications; and, certain other polyesters of polyglycerol described more fully hereinafter.

It is a primary object of this invention to provide an improved cooking and salad oil composition having a reduced tendency to spatter during the frying of moist foods.

It is another object of this invention to provide a clear, storage-stable cooking and salad oil composition which has improved antispattering activity and which maintains its activity for extended storage periods.

It is a further object of this invention to provide an antispattering cooking and salad oil which is also useful for the preparation of stable salad dressings and mayonnaise.

Briefly stated, the cooking and salad oil composition of this invention comprises a clear, liquid glyceride base oil containing as active antispattering agents from about 0.125% to about 0.3%, by weight of the total composition, of unsaturated fatty acid monoester of polyoxyethylene sorbitan containing an average of about 20 oxyethylene units per molecule, said fatty acid having from about 14 to about 18 carbon atoms; and, from about 0.05% to about 0.20%, by weight of the total composition, of unsaturated fatty acid polyester of polyglycerol having an average of from about 4 to about 6 glycerol units, the average ratio of free hydroxyl groups to fatty acid ester groups being from greater than 1.0 to about 2.5, said fatty acid having from about 14 to about 18 carbon atoms. In addition to these antispattering agents, a preferred composition contains from about 20% to about 100%, by weight of the two active antispattering agents, of unsaturated fatty acid polyester of polyglycerol having an average of from about 4 to about 6 glycerol units, the average ratio of free hydroxyl groups to fatty acid ester groups being from about .16 to not more than 1.0, said fatty acid having from about 14 to 18 carbon atoms.

The polyglycerol molecule has the following structure:

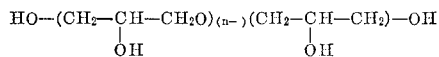

When this molecule is esterified the two terminal hydroxyl groups are not affected; however, esterification can take place at all other hydroxyls. The ratio of free hydroxyl groups to the fatty acid ester groups is determined by dividing the two terminal hydroxyl groups plus the total number of polymer units which can be esterified ($n$) minus those actually esterified by the number of fatty acid ester groups. For example, polyglycerol ester, "decaglycerol tetraoleatte," often referred to as 10–4–0, has a ratio of free hydroxyl groups to fatty acid ester groups of 2.0 determined as follows: two terminal hydroxyl groups plus ten polymer units minus four esterfied units divided by the four fatty acid groups. Another polyglycerol ester, "decaglycerol decaoleate," often referred to as 10–10–0, has two terminal hydroxyl groups and ten fatty acid ester groups or a ratio of free hydroxyl groups to fatty acid ester groups of .2. As a further example, the ratio of free hydroxyl groups to fatty acid ester groups in hexaglycerol tetraoleate is 1.0. It is known that certain general classes of materials such as the sorbitan partial esters and the polyoxyethylene ethers of sorbitan partial esters, respectively, have useful emulsifying properties for plastic and liquid shortenings. For example, the sorbitan esters are disclosed in U.S. Patents 2,303,432 and 2,322,820–1 and their polyoxy ethylene derivatives are disclosed in U.S. Patent 2,380,166. The use of these compounds and other types of materials for emulsifying purposes in opaque liquid shortenings for cake baking is described in U.S. Patents 2,746,868, 2,968,562–4, and 3,117,010. These patents teach broad classes of materials and broad ranges of concentrations for these materials. It was not previously known that the particular esters described in this invention are useful in amounts of from about 0.125% to about 0.3%, by weight, of a clear, liquid glyceride base oil to impart antispattering properties to the oil.

In accordance with the present invention it is essential that the polyoxyethylene sorbitan antispattering agent be a monoester as distinguished from di-, tri-, or higher partial or complete ester. It is also essential that the fatty acid portion of the monoester contain from about 14 to about 18 carbon atoms and that it be derived from predominantly unsaturated fatty acids as distinguished from saturated fatty acids. Examples of suitable unsaturated fatty acids for this purpose are myristoleic, palmitoleic, oleic, linoleic and linolenic acids. The saturated monoesters such as polyoxyethylene sorbitan monostearate and the more fully esterified products such as polyoxyethylene sorbitan tristearate destroy the clarity of the liquid base oil of the cooking and salad oil compositions at low storage temperatures.

Certain broad classes of polyglycerol esters of fatty acids are known to have useful emulsifying properties in shortenings and antispattering properties in margarine. The use of polyglycerol esters of fatty acids in shortenings and cake batters is disclosed in U.S. Patents 2,022,766, 2,023,388, 2,024,356, 2,033,195, 2,132,417, and in an article in 37, Baker's Digest No. 5, pp. 72–5 (October 1963). The use of these esters as antispattering agents for margarine is disclosed in U.S. Patents 2,023,388, 2,132,417 and 2,223,558. U. S. Patent 2,266,591 teaches that polyglycerol esters can be used to retard the deposition of stearine from salad oil at low temperatures such as temperatures below 32° F.

It has been previously stated that in the present invention it is essential that the polyglycerol ester antispattering agent have an average of about 4 to about 6 glycerol units per molecule as distinguished from polyglycerol esters having an average of fewer or substantially more glycerol units, for example 2 or 12 units, respectively. The polyglycerol ester must also have an average ratio of from greater than 1.0 to about 2.5 free hydroxyl groups for each fatty acid ester group. The fatty acid ester groups contain from about 14 to about 18 carbon atoms and are derived from predominantly unsaturated as distinguished from saturated fatty acids. Examples of suitable unsaturated fatty acids for this purpose are myristoleic, palmitoleic, oleic, linoleic, and linolenic acids. Saturated esters derived from acids such as palmitic and stearic acids and the more completely esterified polyglycerol esters such as tetraglycerol trimyristate do not have the antispattering properties of the polyglycerol esters which are useful in this invention.

In the preferred compositions of this invention, the polyglycerol ester storage-stabilizing agent also has an average of about 4 to about 6 glycerol units per molecule; however, the average ratio of free hydroxyl groups to fatty acid ester groups is from about .16 to not more than 1.0 in the storage-stabilizing agent vis-a-vis greater than 1.0 to about 2.5 in the antispattering agent. In each instance, however, the fatty acid ester groups contain from about 14 to about 18 carbon atoms and are derived from predominantly unsaturated fatty acids.

In order to insure the clarity of the compositions of this invention, it is essential that the liquid glyceride base oil be substantially free of general purpose shortening emulsifiers such as mono- and diglyceride esters, lactylated glyceride esters, and any other materials which might tend to cloud the base oil or otherwise interfere with its clarity. The use of substances which are fluidizers, for example, aluminum tripalmitate, reduce the antispattering characteristics of the cooking and salad oil compositions; their use should also be avoided.

A wide variety of liquid glyceride base oils can be used in the cooking and salad oil compositions of this invention. Included among suitable oils are the so-called natural salad oils such as, for example, olive oil, sunflower seed oil, safflower oil, and sesame seed oil. Other naturally-occurring liquid glyceride oils such as, for example, cottonseed oil and corn oil, are also useful; these oils are given a preliminary "winterizing," dewaxing, or similar treatment to remove the higher melting stearins before being used as a base oil. Certain other oils such as, for example, soybean oil, can be partially hydrogenated before use to improve their resistance to oxidative deterioration during prolonged storage periods; the higher melting solids formed during the hydrogenation treatment are preferably removed by winterization.

Suitable clear liquid glyceride base oils also can be obtained by directed, low temperature interesterification or rearrangement of animal or vegetable fatty materials, followed by the removal of the higher melting solids formed during the reaction. For an example of this procedure, see U.S. Patent 2,442,532. Another group of oils suitable for use as the liquid glyceride base oil is that group of oils in which one or more short-chain fatty acids, such as acetic acid and propionic acid, replace, in part, the long-chain fatty acids present in natural triglyceride oils.

Other useful liquid glyceride oils can be derived from animal, vegetable and marine sources, including mixtures of various such oils. Particularly preferred oils for use in this invention are cottonseed oil, soybean oil, and mixtures thereof.

According to one aspect of this invention, the polyoxyethylene sorbitan monoester component, prior to its admixture with the clear base oil, is subjected to an acidifying treatment with an acid such as phosphoric acid, sulfuric acid, or hydrochloric acid, or, alternatively, is passed through an acid activated filtering clay such as "Superfiltrol." Although the pure monoester product probably does not exhibit a true pH, since it is essentially free of water, the monoester is preferably treated with acid media so that it ultimately shows a pH of not more than about 7 (preferably between about 6.5 and 7) in the presence of a trace of water when measured by conventional pH indicators, for example, a Beckman pH meter. The term "acid-treated" is used herein to describe the above-described or similar acidifying treatment. "Apparent pH" is used herein to describe the pH of the monoester in the presence of a trace of water either before or after it is "acid-treated."

The following examples illustrate the present invention; however, it is understood that the invention is not limited thereto since other variations will be readily discernible to those skilled in the art after reading the description of the invention. All percentages and proportions in the following examples are by weight rather than volume unless otherwise specified.

EXAMPLE 1

A cooking and salad oil composition was prepared from refined, bleached and deodorized soybean oil partially hydrogenated to an iodine value of about 107 and winterized after hydrogenation. 0.125%, by weight, acid-treated "Tween-80" and 0.2%, by weight, "Drewpol 10-4-0" were dispersed in the oil by thoroughly mixing the oil and the additives in a Waring Blendor for three minutes.

"Tween-80" is a commercially-available product which is a mixture of polyoxyethylene sorbitan esters of predominantly monounsaturated oleic acid; it contains an average of about twenty oxyethylene units in the molecule [i.e., polyoxyethylene (20) sorbitan monoöleate]. The commercial product has an apparent pH in the presence of a trace of water of about 8. The "Tween-80" used in this example was acid-treated with phosphoric acid (85% solution) to reduce its apparent pH to about 6.5 in the presence of a trace of water when measured with a Beckman pH meter. The acid treatment was carried out by first heating the "Tween-80" to about 145° F. in a stainless steel bowl to reduce its viscosity before adding the amount of acid calculated to lower the pH of the "Tween-80" to the desired level, and slowly stirring the mixture to insure that the acid became uniformly dispersed.

"Drewpol 10-4-0" is a commercial product described by the manufacturer as "decaglycerol tetraoleate"; however, it has been determined to be a mixture of polyglycerol esters of predominantly monounsaturated oleic acid. It has individual polyglycerol units ranging from diglycerol to decaglycerol and it has an average degree of polymerization of the glycerol moiety of between 4 and 6 glycerol units per polyglycerol molecule. The average ratio of free hydroxyl groups to fatty acid ester groups is about 2.0.

The liquid oil composition containing "Tween-80" and "Drewpol 10-4-0" was used in frying a frozen minute steak. The oil and other material which spattered from the frying pan during frying were collected and weighed in order to determine the amount of spatter. In carrying out this test, the frozen steak (75 grams) was placed in the center of a ten-inch square "Sunbeam" electric frypan, after the oil (30 grams) was heated to the frying temperature of 360° F., and fried for two and one-half minutes on each side. The oil and other material which spattered from the frying pan during frying was collected on a three foot by three foot square sheet of aluminum foil placed centrally under the frying pan. The amount of spatter was determined by the difference in the weight of the original foil and the foil with spattering. In this particular test, the amount of spatter was 0.57 gram. Using the same hydrogenated soybean base oil without "Tween-80," "Drewpol 10-4-0" or other additives in an identical test produced 3.72 grams of spatter. Hydrogenated soybean oil (I.V.=107) containing 0.125% "Tween-80" but no "Drewpol 10-4-0" or other additives gave 1.58 grams in a comparative test. The oil containing both "Tween-80" and "Drewpol 10-4-0" reduced spatter about 85% over plain oil; there was about a 60% reduction in spatter over the plain oil using the oil containing "Tween-80."

The flavor of the oil composition containing "Tween-80" and "Drewpol 10-4-0" was tested by a panel of experts and graded on a scale of 1 to 10. A flavor grade rating of 10 represents an absolutely bland oil which is practically unobtainable in a commercial cooking and salad oil. A rating of 5 or greater represents a suitable bland taste for a marketable cooking and salad oil the taste of which the average person cannot detect. The cooking and salad oil composition containing "Tween-80" and "Drewpol 10-4-0" had an average flavor grade rating of 7.8. This rating is substantially the equivalent of the average (7.4) given to the same base oil without any additives.

EXAMPLE 2

The clarity of cooking and salad oil compositions containing "Tween-80" which had been acid-treated in the manner described in Example 1 and "Drewpol 10-4-0" is demonstrated in the following table reporting the light absorbence of a control sample and three oil samples at 550 mµ on a Carey spectrophotometer. Refined, bleached and deodorized soybean oil partially hydrogenated to an Iodine value of about 107 prior to being winterized was used as the base oil for the control sample and for each oil sample. A spectrophotometer reading was first obtained on the control sample and on each oil sample after the addition and dispersion of the "Drewpol 10-4-0"; a second reading was taken after the addition to and dispersion of the "Tween-80" in the oil samples. The slight variation in results between samples a, b and c in the following table is attributed to the fact that three different commercial samples of "Drewpol 10-4-0" were used. In each instance, however, the "Drewpol 10-4-0" was determined to be a mixture of polyglycerol esters of predominantly mono unsaturated oleic acid. The average degree of polymerization of the glycerol moiety was between 4 and 6 glycerol units; the average ratio of free hydroxyl groups to fatty ester groups was about 2.0. The decrease in the light absorbence which was obtained with the combination of "Drewpol 10-4-0" and "Tween-80" vis-a-vis the "Drewpol 10-4-0" alone demonstrates that oils containing the combination of additives have greater clarity than those oils containing only "Drewpol 10-4-0." The tendency of "Drewpol 10-4-0" to cloud the base oil is overcome by the combination of "Drewpol 10-4-0" and "Tween-80."

TABLE I

| | "Tween-80" Weight Percent Concentration | "Drewpol 10-4-0" Weight Percent Concentration | Light Absorbence at 550 mµ |
|---|---|---|---|
| | 0 | 0 | 0.09 |
| (a) | 0 | 0.1 | 0.27 |
| | 0.2 | 0.1 | 0.22 |
| (b) | 0 | 0.1 | 0.29 |
| | 0.2 | 0.1 | 0.18 |
| (c) | 0 | 0.1 | 0.24 |
| | 0.2 | 0.1 | 0.16 |

EXAMPLE 3

This example illustrates the antispatter utility of clear, storage-stable cooking and salad oils containing "Tween–80," "Drewpol 10–4–0" (both described in Example 1), and a third additive, "Drewpol 10–10–0" which imparts storage stability to the compositions. "Drewpol 10–10–0" is a commercial product described by the manufacturer as "decaglycerol decaoleate"; however, it has been determined to be a mixture of polyglycerol esters of predominantly monounsaturated oleic acid. It has individual polyglycerol units ranging from diglycerol to decaglycerol and it has an average degree of polymerization of the glycerol moiety of between 4 and 6 glycerol units per polyglycerol unit. The average ratio of free hydroxyl groups to fatty acid ester groups is .2. In this example, four oil samples were compared by uniformly dispersing the additives in refined, bleached, deodorized and winterized soybean oil partially hydrogenated to an iodine value of about 107. The same base oil without additives was used as a control. Spatter tests on the control and the four samples were carried out according to the procedure described in Example 1. The results of these tests are tabulated in the following table.

TABLE II

| "Tween-80" Weight Percent Concentration | "Drewpol 10-4-0" Weight Percent Concentration | "Drewpol 10-10-0" Weight Percent Concentration | Grams of Spatter | Percent Spatter Reduction |
| --- | --- | --- | --- | --- |
| 0 | 0 | 0 | 5.46 | |
| 0.20 | 0.10 | 0.06 | 0.66 | 88 |
| 0.30 | 0.10 | 0.18 | 0.78 | 86 |
| 0.30 | 0.05 | 0.06 | 0.81 | 85 |
| 0.30 | 0.05 | 0.30 | 0.84 | 85 |

When clear oils containing "Tween-80", "Drewpol 10–4–0" and "Drewpol 10–10–0" are subjected to storage stability tests they are found to be more stable to prolonged storage than are oils containing only "Tween–80" and "Drewpol 10–4–0."

Clear oils containing "Tween–80" and "Drewpol 10–4–0" have greater antispatter activity than oils containing the same amounts of "Tween–80" and "Drewpol 10–10–0"; however, the oils containing the "Drewpol 10–10–0" have greater storage stability than those containing the "Drewpol 10–4–0." Oils containing all three additives, "Tween–80," "Drewpol 10–4–0" and "Drewpol 10–10–0" have both improved antispatter activity and storage stability.

Variations and modifications of the present invention can be made upon a study of the foregoing disclosure by those skilled in the art of cooking and salad oils. Such variations and modifications are intended to be within the spirit and scope of the invention as defined in the appended claims.

What is claimed is:

1. A cooking and salad oil composition having antispattering properties comprising a clear, liquid glyceride base oil containing as active antispattering agents from about 0.125% to about 0.3%, by weight of the total composition, of unsaturated fatty acid monoester of polyoxyethylene sorbitan containing an average of about 20 oxyethylene units per molecule, said fatty acid having from about 14 to about 18 carbon atoms, said ester acid treated to an apparent pH between about 6.5 and 7.0 in the presence of a trace of water; and, from about 0.05% to about 0.20%, by weight of the total composition, of unsaturated fatty acid polyester of polyglycerol having an average of from about 4 to about 6 glycerol units, the average ratio of free hydroxyl groups to fatty acid ester groups being from greater than 1.0 to about 2.5, said fatty acid having from about 14 to about 18 carbon atoms.

2. The composition of claim 1 in which the unsaturated fatty acid monoester of polyoxyethylene sorbitan is polyoxyethylene (20) sorbitan monooleate.

3. The composition of claim 1 in which the liquid glyceride base oil is selected from the group consisting of cottonseed oil, soybean oil, and mixtures thereof.

4. The composition of claim 1 which contains from about 20% to about 100%, by weight of the active antispattering agents, unsaturated fatty acid polyester of polyglycerol having an average of from about 4 to about 6 glycerol units, the average ratio of free hydroxyl groups to fatty acid ester groups being from about .16 to not more than 1.0, said fatty acid having from about 14 to about 18 carbon atoms.

5. A storage-stable cooking and salad oil composition having antispattering properties comprising a clear liquid glyceride base oil containing as active antispattering agents from about 0.125% to about 0.3%, by weight of the total composition, of polyoxyethylene (20) sorbitan monooleate acid-treated to an apparent pH between about 6.5 and 7.0 in the presence of a trace of water; from about 0.05% to about 0.20%, by weight of the total composition, of unsaturated fatty acid polyester of polyglycerol having an average of from about 4 to about 6 glycerol units, the average ratio of free hydroxyl groups to fatty acid ester groups being from greater than 1.0 to about 2.5, said fatty acid having from about 14 to about 18 carbon atoms; and, from about 20% to about 100%, by weight of the active antispattering agents, of unsaturated fatty acid polyester of polyglycerol having an average of from about 4 to about 6 glycerol units, the average ratio of free hydroxyl groups to fatty acid ester groups being from about .16 to not more than 1.0, said fatty acid having from about 14 to about 18 carbon atoms.

References Cited

UNITED STATES PATENTS 2,023,388　12/1935　Harris _____ 260—410.6
3,355,302　11/1967　Purves _____ 99—163

M. W. GREENSTEIN, Primary Examiner.

U.S. Cl. X.R.

99—118, 144